United States Patent
Madam et al.

(10) Patent No.: US 9,581,995 B2
(45) Date of Patent: Feb. 28, 2017

(54) SYSTEMS AND METHODS FOR MONITORING OF EQUIPMENT USING A CONFIGURABLE RULE BASE

(71) Applicant: GENERAL ELECTRIC COMPANY, Schenectady, NY (US)

(72) Inventors: Narayanan Urupuniakavu Madam, Bangalore (IN); Haiyan Sun, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 587 days.

(21) Appl. No.: 13/741,179

(22) Filed: Jan. 14, 2013

(65) Prior Publication Data

US 2014/0200686 A1    Jul. 17, 2014

(51) Int. Cl.
G05B 13/02    (2006.01)
G05B 23/02    (2006.01)

(52) U.S. Cl.
CPC .................................. *G05B 23/0229* (2013.01)

(58) Field of Classification Search
None
See application file for complete search history.

(56) References Cited

U.S. PATENT DOCUMENTS

| | | | |
|---|---|---|---|
| 6,662,235 B1 * | 12/2003 | Callis | H04L 41/0681 709/223 |
| 7,933,744 B2 | 4/2011 | Jammu et al. | |
| 8,359,338 B2 * | 1/2013 | Butterfield | G06F 19/3406 707/803 |
| 2006/0026205 A1 * | 2/2006 | Butterfield | G06F 19/3456 |
| 2006/0287740 A1 * | 12/2006 | Ertel | 700/65 |
| 2007/0005311 A1 * | 1/2007 | Wegerich et al. | 703/2 |
| 2011/0172830 A1 * | 7/2011 | Milder et al. | 700/277 |
| 2012/0016702 A1 * | 1/2012 | Staaf | 705/7.11 |
| 2012/0078578 A1 | 3/2012 | Piccirillo et al. | |

OTHER PUBLICATIONS

Owner's Handbook for Onan power generators published by Cummins Power Generation (2005), p. 26.*

* cited by examiner

*Primary Examiner* — Mohammad Ali
*Assistant Examiner* — Bernard G Lindsay
(74) *Attorney, Agent, or Firm* — Sutherland Asbill & Brennan LLP (57) ABSTRACT

Systems, methods, and computer-readable media for monitoring of equipment using a configurable rule base are disclosed. Configuration information associated with equipment may be identified, and a set of one or more configured rules may be generated from one or more configurable base rules based at least in part on the configuration information. One or more measured parameters associated with the equipment may be analyzed based at least in part on the set of one or more configured rules, and output information associated with the equipment may be generated based at least in part on the analysis.

20 Claims, 3 Drawing Sheets

SYSTEMS AND METHODS FOR MONITORING OF EQUIPMENT USING A CONFIGURABLE RULE BASE

FIELD OF THE DISCLOSURE

Embodiments of the disclosure relate generally to equipment monitoring, and more particularly, to equipment monitoring using a configurable rule base.

BACKGROUND

Real-time monitoring of industrial equipment such as turbines, generators, and so forth may be performed to ensure that the equipment is operating properly. Operational data may be collected and analyzed to determine whether potential failure conditions are present. If such failure conditions are determined to be present, associated alarms may be generated. Real-time equipment monitoring may also be performed to determine performance trends, provide recommendations to an operator on improving equipment performance, and so forth.

Conventional equipment monitoring systems must be specifically tailored to each installation site where the equipment being monitored is deployed and to each particular deployment configuration. Further, extensive validation is often required to ensure that the monitoring system is capable of effectively monitoring equipment having a particular deployment configuration. Thus, conventional equipment monitoring systems entail significant maintenance and deployment costs and fail to provide for monitoring of equipment across a variety of deployment configurations.

BRIEF DESCRIPTION OF THE DISCLOSURE

According to one or more embodiments of the disclosure, a method is disclosed. The method may be performed, at least in part, by one or more computers comprising one or more processors. For example, the method may be performed upon execution by one or more processors of computer-executable instructions stored in at least one memory. The method may include: i) identifying configuration information associated with an equipment, ii) generating a set of one or more configured rules from one or more configurable base rules based at least in part on the configuration information associated with the equipment, iii) analyzing one or more measured parameters associated with the equipment based at least in part on the set of one or more configured rules, and iv) generating output information associated with the equipment based at least in part on the analyzing.

In one or more additional embodiments of the disclosure, a system is disclosed. The system may include one or more computers with each computer including one or more processors and at least one memory communicatively linked to the one or more processors. The at least one memory of at least one of the computers may store i) a configuration module that includes computer-executable instructions executable by at least one processor to identify configuration information associated with an equipment, ii) a rules engine that includes computer-executable instructions executable by the at least one processor to generate, based at least in part on the configuration information, a set of one or more configured rules from one or more configurable base rules, iii) computer-executable instructions executable by the at least one processor to analyze one or more measured parameters associated with the equipment based at least in part on the set of one or more configured rules, and iv) computer-executable instructions executable by the least one processor to generate output information associated with the equipment based at least in part on the analysis of the one or more measured parameters associated with the equipment.

In one or more additional embodiments of the disclosure, a computer-readable medium is disclosed. The computer-readable medium may store computer-executable instructions that upon execution by at least one processor causes various operations to be performed. The operations may include: i) identifying configuration information associated with an equipment, ii) generating a set of one or more configured rules from one or more configurable base rules based at least in part on the configuration information associated with the equipment, iii) analyzing one or more measured parameters associated with the equipment based at least in part on the set of one or more configured rules, and iv) generating output information associated with the equipment based at least in part on the analyzing.

Other embodiments, systems, methods, and features of embodiments of the disclosure will be apparent to those skilled in the art from the following detailed description, the accompanying drawings, and the appended claims.

BRIEF DESCRIPTION OF THE DRAWINGS

The detailed description is set forth through reference to the accompanying drawings, which are not necessarily drawn to scale. A brief description of each drawing is provided below. In the drawings, same reference numerals indicate similar or identical elements; however, different reference numerals may be used to indicate similar or identical elements as well.

DETAILED DESCRIPTION OF EMBODIMENTS OF THE DISCLOSURE

Illustrative embodiments of the disclosure will now be described more fully hereinafter through reference to the accompanying drawings, in which some, but not all embodiments of the disclosure may be shown. The disclosure may be embodied in many different forms and should not be construed as being limited to the embodiments set forth herein; rather, these embodiments are provided so that this disclosure will satisfy applicable legal requirements.

Illustrative embodiments of the disclosure relate to, among other things, monitoring of equipment using a configurable rule base. Various embodiments of the disclosure may be described in the context of fluid-cooled generators which may include water-cooled generators, oil-cooled generators, hydrogen-cooled generators, air-cooled generators, and so forth. However, one of ordinary skill in the art will appreciate that these examples are provided merely for ease of explanation and that embodiments of the disclosure are applicable to any type of equipment that is monitored based on various monitoring rules or algorithms in order to assess the operational health of the equipment.

Equipment monitoring may be conducted for a variety of reasons such as, for example, to detect potential operational anomalies (e.g. failure conditions) and potentially generate alarms upon the detection of such anomalies, to determine performance trends, to provide recommendations to a user to improve equipment performance, and so forth.

Equipment monitoring generally involves continuous or periodic monitoring of the equipment to acquire operational data associated with the equipment's operation and the subsequent application of various monitoring rules or algorithms to the operational data to generate output data. The output data may be analyzed to provide an assessment of the health of the equipment and to determine whether any potential failure conditions exist. Indications of potential failure of the equipment may be provided to a customer or support personnel at the equipment installation site along with, potentially, information identifying potential causes of such failures and/or recommendations for ultimately avoiding the occurrence of such failures.

The monitoring rules that may be utilized to monitor the operation of equipment generally need to account for various design, installation, and operational parameters associated with the equipment, which may vary from one type of equipment to the next. Even among equipment that provides the same type of functionality (e.g., fluid-cooled generators), design, installation, and operational distinctions may exist from one installation to the next. For example, while two example generators may share similar specifications and/or ratings (e.g., both are water-cooled generators), various design, installation, and/or operational parameters may differ between the generators.

Design parameters may include any parameter relating to the design of the equipment and the manner in which the equipment operates. For example, using the non-limiting example of fluid-cooled generators, design parameters may include a slot configuration of the generator (e.g., 36-slot, 42-slot, etc.), a number or manner of connection of stator windings in the generator, the manner in which the generator's cooling circuit is designed and/or connected, a number of cooling fluid passes (e.g., single or double pass), a number or placement of resistance temperature detectors (RTDs) or other temperature control (TC) sensors, an arrangement of fluid flow path patterns, and so forth. A slot configuration may refer to a number or placement of slots in the generator that receive the stator windings (e.g., stator bars). The stator windings may have passages formed therein that permit the flow of fluid for cooling purposes.

Installation parameters may include any parameter associated with the manner in which the equipment is installed and brought to an operational state at an installation site. For example, installation parameters may include a number or positioning of RTDs, TCs, or other sensors, or any other suitable parameter relating to on-site installation of the equipment.

Operational parameters may include any parameter associated with an operating condition and/or state of the equipment. For example, operational parameters may include operating temperatures, operating pressures, or other measurable parameters associated with the operation of the equipment. In various embodiments, particular operating temperatures, pressures, and so forth that may be used to assess the operating health of equipment and to determine whether any indicators of potential failure may be present may differ based on various design parameter(s) and/or installation parameter(s) associated with the equipment. For example, the number and/or positioning of RTDs or TCs may affect which operating temperature measurements from which sensors are used to assess the operating state of the equipment.

It should be appreciated that the above examples of design, installation, and operational parameters are merely illustrative and that any number or types of parameters may be associated with any type of equipment including any type of generator or other type of equipment. Further, while certain parameters may have been categorized as design, installation, or operational parameters, it should be appreciated that this categorization is not necessarily mutually exclusive and that various parameters may be classified as any combination of design, installation, or operational parameters (e.g., number or positioning of sensors).

As previously noted, equipment monitoring systems conduct continuous or periodic monitoring of the operation of equipment to collect various operational data, perform various analyses on the operational data, and determine if any potential failure conditions may be present based on the analyses. The types of failure conditions that may occur for a particular type of equipment (e.g., a liquid-cooled generator) may generally be the same or similar for various specific installations. However, as previously noted, a broad range of variations in design, installation, and/or operational parameters may be present across different installations. As a result, in order to properly analyze the operational data associated with a particular installation and assess the presence of potential failure conditions with respect to that installation, conventional equipment monitoring systems must be specifically configured to each installation.

This often involves a considerable about of manual effort such as, for example, in obtaining the specific configuration information associated with a particular installation (e.g., the design, installation, and/or operational parameters associated with the installation) and in updating the monitoring rules to be able to accept the specific configuration information as input and generate meaningful data therefrom. Further, extensive validation and testing may be required to ensure that the equipment monitoring system has been properly configured to monitor a particular installation. With respect to conventional equipment monitoring systems, this process of obtaining the configuration information, performing necessary updates, and performing validation and testing may entail considerable costs, consume an undesirable amount of resources, and result in delays in implementing the monitoring system for a particular installation.

Embodiments of the disclosure relate to systems and methods for defining a configurable rule base that includes one or more configurable monitoring rules. The configurable base rules may be configured through one or more automated processes based on respective configuration information associated with one or more specific equipment installations. As previously noted, the respective configuration information may include design, installation, and/or operational parameters associated with a particular installation.

Each configurable monitoring rule may include a static component and a configurable component. The static component may be an algorithm, rule, formula, or the like that allows for i) generation of derived values from values of measured parameters based on one or more specified relationships between the measured parameters, and ii) comparison of the derived values to assess the potential presence of a fault condition. The static component may be independent of the deployment configuration of a specific installation. The configurable component of the monitoring rule may provide for parameterizing and configuring the static component based on configuration information associated with a particular installation.

As a non-limiting example, a static component of a configurable monitoring rule may include a rule that indicates that a failure condition may be present if a difference between the temperature difference between the inlet and outlet of the cooling circuit of a generator and an average temperature change over a set of conductor bars with which the cooling circuit is associated exceeds a threshold value. The configurable component of the rule may allow for specifying particular slot numbers, cooling circuits, threshold values, and so forth based on respective configuration information associated with particular generator installations. In this manner, a single configurable rule may be used to detect a potential fault condition for any number of distinct installations. Upon configuration of the static component of the rule with configuration information associated with a particular installation using the configurable component, a configured rule may be generated from the configurable base rule. The configured rule may then be used to analyze operating data associated with a particular installation and generate output data that is relevant to the particular installation. The output data may then be assessed to determine whether potential fault conditions exist.

It should be appreciated that the above example is provided solely for illustrative purposes and that embodiments of the disclosure encompass any configurable rule that includes a static component that defines relationships between various measured parameters (e.g., rules, formulas, etc.) that may be indicative of a potential fault condition and a configurable component that allows the static component to be configured with configuration information that is relevant to a particular installation. The configurable component allows the relationships between the measured parameters defined by the static component to be determined for a particular installation and provides for failure detection with respect to the particular installation.

Systems and methods of the disclosure provide for configuring a base set of monitoring rules with configuration information relevant to a particular installation in order to generate a set of rules configured for that particular installation. The set of configured rules may then be analyzed based on operating data associated with the particular installation in order to determine whether potential failure conditions exist. The operating data may include measurements of one or more parameters associated with the particular installation such as a temperature measurement, a pressure measurement, a fluid flow measurement, a current measurement, a voltage measurement, a power measurement, and so forth.

Technical effects achieved by embodiments of the disclosure include, among other things, detecting potential failure conditions with respect to different installations having potentially different design, installation, and/or operational parameters associated therewith using a base set of configurable monitoring rules. For each installation, a same base set of configurable rules may be configured with configuration information associated with that installation to generate a set of configured rules specific to that installation. The set of configured rules may then be used to analyze operating data associated with a specific installation and determine whether potential failure conditions exist with respect to that specific installation. Technical effects achieved by embodiments of the disclosure further include elimination or at a least substantial reduction in the configuration, testing, and validation time required to configure conventional monitoring systems, improved ease of deployment and monitoring equipment installations, and so forth.

Figure 1A:
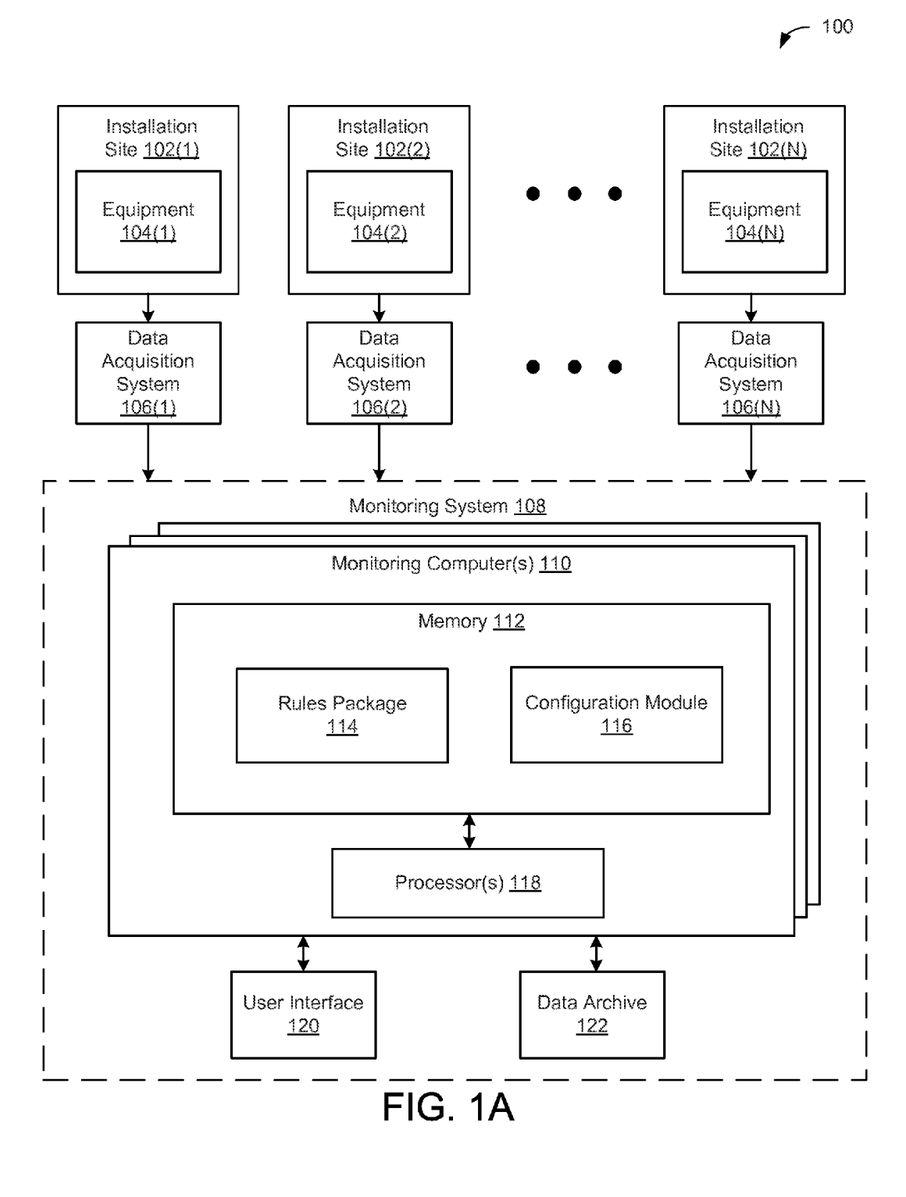
FIG. 1A is a schematic block diagram of an illustrative networked architecture that includes an illustrative equipment monitoring system in accordance with one or more embodiments of the disclosure.

FIG. 1A depicts an illustrative networked architecture 100 in which an equipment monitoring system 108 in accordance with one or more embodiments of the disclosure is configured to interact with other devices and/or components to carry out various embodiments of the disclosure.

FIG. 1A depicts one or more pieces of equipment 104 (1)-104(N) (which, depending on the context, may be referred to herein collectively or individually as equipment 104) that may each be installed in a respective installation site of one or more installation sites 102(1)-102(N) (which, depending on the context, may be referred to herein collectively or individually as installation site 102). While the equipment 104 may be any type that may be monitored, various illustrative embodiments of the disclosure may be described in the context of power generators. In certain embodiments, each equipment installation 104 at a particular installation site 102 may correspond to a same type of equipment (e.g., a fluid-cooled generator) having similar specifications as equipment installations 104 at other installation sites 102. However, each equipment installation 104 may have a unique set of design, installation, and/or operating parameters associated therewith. As a non-limiting example, a particular generator (e.g., 104(1)) may have different design parameters (e.g., a different number of slots, a different cooling circuit design, etc.), different installation parameters (e.g., a different arrangement of sensors, a different number of sensors, etc.), and/or different operating parameters (e.g., different temperature values from different sensors that are analyzed to assess operating health, different fault condition threshold values, etc.) as compared to another generator installation (e.g., 104(2)).

One of more data acquisition systems 106(1)-106(N) (which, depending on the context, may be referred to herein collectively or individually as data acquisition system 106) are also depicted in FIG. 1A. Each data acquisition system 106 may gather, collect, detect, receive, and/or retrieve operating data corresponding to measured values of one or more parameters associated with the operation of a corresponding equipment installation 104. The one or more measured values may include, but are not limited to, one or more temperature measurements, one or more pressure measurements, one or more fluid flow measurements, one or more current measurements, one or more voltage measurements, one or more power measurements, and so forth. This operational data may be collected by the data acquisition system 106 in real-time during operation of the equipment 104. While a separate data acquisition system 106 is depicted as corresponding to each equipment installation 104, it should be appreciated that a particular data acquisition system 106 may retrieve or receive operating data from multiple equipment installations 104, either at a particular installation site 102 or across multiple installation sites 102.

The monitoring system 108 may include one or more monitoring computers 110 (which, depending on the context, may be referred to herein collectively or individually as monitoring computer 110). Various illustrative hardware and software components of the monitoring computer 110 will be described in more detail hereinafter through reference to FIGS. 1A-1B.

The operational data collected by one or more of the data acquisition systems 106 may be transmitted to and received by the monitoring system 108. In certain embodiments, the operational data may be "pushed" to the monitoring system 108 while, in other embodiments, the operational data may be transmitted to the monitoring system 108 by the data acquisition system 106 in response to a received request for the operating data. Upon receipt, the operating data may be stored in one or more of the monitoring computers. In certain embodiments, the monitoring system 108 may be deployed at a specific installation site 102 and may receive operating data associated with a specific piece of equipment 104 (e.g., a specific liquid-cooled generator) at the installation site 102 or respective operating data associated with multiple pieces of equipment 102 at the specific installation site 102. In other embodiments, such as the embodiment depicted in FIG. 1A, the monitoring system 108 may receive respective operating data associated with different equipment installations 104 deployed at multiple installation sites 102. The equipment installations 104 may correspond to different types of equipment, a same type of equipment, or combinations thereof.

The monitoring system 108 may receive the respective operating data from data acquisition systems 106 at different installation sites 102 or at a same installation site 102 via one or more networks (not shown). The network(s) may include any suitable network including, but not limited to, any one or a combination of different types of suitable communications networks, such as cable networks, the Internet, wireless networks, cellular networks, or any other private and/or public networks. Further, the network(s) may include any type of medium over which network traffic may be carried including, but not limited to, coaxial cable, twisted wire pair, optical fiber, hybrid fiber coaxial (HFC), microwave terrestrial transceivers, radio frequency communications, satellite communications, or combinations thereof.

The monitoring computer 110 may have a user interface 120 associated therewith which may be, for example, a human-machine interface (HMI) that presents operational data and/or output data generated by the monitoring computer 110 to, for example, a human operator. It should be noted that, while not depicted in FIG. 1A, one or more of the data acquisition systems 106 may also have a respective HMI associated therewith. In addition, the monitoring computer 110 may further be configured to store operational data received from the data acquisition system 106 in a data archive 122 which may include one or more datastores. The monitoring computer 110 may be further configured to retrieve stored data from the data archive 122 such as, for example, to analyze the operational data based on a set of one or more configured rules.

In certain embodiments, at least a portion of the monitoring system 108 (e.g., one or more of the monitoring computers 108, the user interface 120, and/or the data archive 122, etc.) may form at least part of a type of supervisory control and data acquisition (SCADA). In such embodiments, the SCADA system may gather, acquire, and/or receive the operational data from and/or transmit commands to the one or more data acquisition systems 106. Although not depicted in FIG. 1A, remote terminal units (RTUs) and/or programmable logic controllers (PLCs) may be connected to sensors (e.g., temperature sensors) provided as part of the equipment installation 104 that serve to receive sensor signals and convert the sensor signals to digital data, which may then be transmitted to the SCADA system.

Figure 1B:
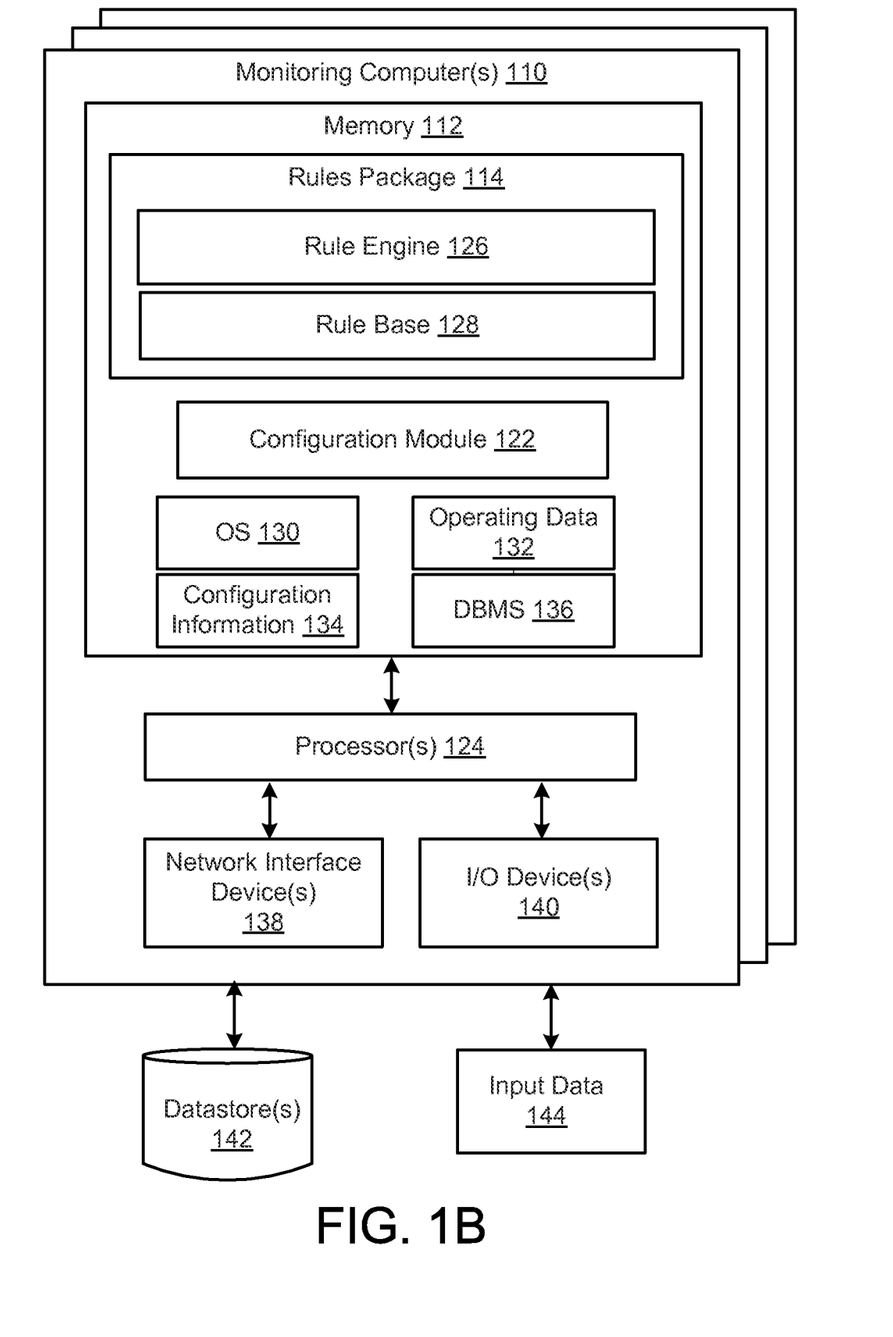
FIG. 1B is a schematic block diagram of an illustrative equipment monitoring system computer in accordance with one or more embodiments of the disclosure.

Referring to FIGS. 1A and 1B, the monitoring computer 110 may include at least one memory 112 and one or more processors 118 (which, depending on the context, may be referred to herein collectively or individually as memory 112 and processors 118, respectively). The processors 118 may include any suitable processing unit capable of accepting digital data as input, processing the input data based on stored computer-executable instructions, and generating output data. The computer-executable instructions may be stored, for example, in the memory 112 and may include operating system software, application software, program modules, and so forth. The processors 118 may be configured to execute the computer-executable instructions to cause various operations to be performed. The processors 118 may include any type of processing unit including, but not limited to, a central processing unit, a microprocessor, a Reduced Instruction Set Computer (RISC) microprocessor, a microcontroller, an Application Specific Integrated Circuit (ASIC), and so forth.

The memory 112 may store program instructions that are loadable and executable by the processors 118, as well as data manipulated and generated by the processor(s) 118 during execution of the program instructions. Depending on the configuration and implementation of the monitoring computer 110, the memory 112 may be volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 112 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

Although not depicted in FIGS. 1A-1B, the monitoring computer 110 may further include additional data storage that provides non-volatile storage of computer-executable instructions and other data. Such additional data storage may include removable storage and/or non-removable storage including, but not limited to, magnetic storage, optical disk storage, and/or tape storage. The memory 112 and/or additional non-volatile data storage, removable and/or non-removable, are examples of computer-readable storage media (CRSM).

Referring to FIG. 1B, the monitoring computer 110 may further include one or more network interface devices 138 that facilitate communication of the monitoring computer 110 with other computing devices or application software forming part of the networked architecture 100 depicted in FIG. 1A. For example, the monitoring computer 110 may utilize the network interface device(s) 138 to communicate with the data acquisition system 106 or other devices or applications.

The monitoring computer 110 may additionally include one or more input/output (I/O) devices 140, such as a keyboard, a mouse, a pen, a voice input device, a touch input device, a display, speakers, a camera, a microphone, a printer, and so forth, for receiving user input and/or providing output to a user.

The memory 112 may include various program modules comprising computer-executable instructions that upon execution by the processors 118 cause the monitoring computer 110 to perform various operations. For example, the memory 112 may have loaded therein an operating system (O/S) 130 that provides an interface between other application software executing on the monitoring computer 110 and hardware resources of the monitoring computer 110. More specifically, the O/S 130 may include a set of computer-executable instructions for managing hardware resources of the monitoring computer 110 and for providing common services to other application programs (e.g., managing memory allocation among various application programs). The O/S 130 may include any operating system now known or which may be developed in the future including, but not limited to, a Microsoft Windows® operating system, an Apple OSX™ operating system, Linux, Unix, a mainframe operating system such as Z/OS, a mobile operating system, or any other proprietary or freely available operating system.

The memory 112 may further include a database management system (DBMS) 136 for accessing, retrieving, storing, and/or manipulating data stored in one or more datastores (e.g., datastore(s) 142 which will be described in more detail later in this disclosure). The DBMS 136 may use any of a variety of database models (e.g., relational model, object model, etc.) and may support any of a variety of query languages.

Still referring to FIGS. 1A-1B, the memory 112 may further store a rules package 114 that may include a rules engine 126 and a rule base 128 which may include one or more configurable monitoring rules. In certain embodiments, the rule base 128 may include multiple sets of configurable monitoring rules with each set of configurable rules being associated with a particular type of equipment (e.g., a liquid-cooled generator). The rules engine 126 may include computer-executable instructions that upon execution by the processors 118 causes one or more configurable rules included in the rule base 128 to be configured with configuration information 134 to generate a set of configured monitoring rules. As will be described in more detail hereinafter, the set of configured rules may be used to analyze operating data 132 associated with a particular equipment installation in order to assess the health of the equipment and determine whether any potential failure conditions are present.

For the purposes of the following discussion, the configuration information 134 stored in the memory 112 will be assumed to be configuration information relating to a particular equipment installation 104, or more specifically, to design, installation, and/or operating parameters associated with a particular equipment installation 104. Further, the operating data 132 stored in the memory 112 will be assumed to be operating data relating to the same particular equipment installation 104. However, it will be appreciated by one of ordinary skill in the art that the configuration information 134 and/or the operating data 132 stored in the memory 112 may, at any point in time, include respective configuration information and/or operating associated with each of a plurality of different equipment installations, in which case, the respective configuration information associated with a particular equipment installation may be used to configure a relevant set of configurable rules included in the rule base 128 in order to assess respective operating data associated with that particular equipment installation.

The memory 112 may further include a configuration module 116. The configuration module 116 may include computer-executable instructions that upon execution by the processors 118 configures the processors 118 to retrieve the configuration information 134 associated with a particular equipment installation 104 and configure an appropriate set of configurable rules provided as part of the rule base 128 with the retrieved configuration information 134 to generate a set of rules that are configured for that particular equipment installation.

Computer-executable instructions provided as part of the configuration module 116 may have previously been executed by the processors 118 to retrieve or receive the configuration information 134 from one or more sources and to store the configuration information 134 in the memory 112. For example, at least a portion of the configuration information 134 may have been retrieved from one or more datastores 142 storing the information or received by one or more devices controlling access to the datastore(s) 142.

The datastore(s) 142 may, in certain embodiments, store respective configuration information associated with a plurality of distinct equipment installations. As noted previously, the configuration information associated with a particular equipment installation may include information relating to various design, installation, and/or operating parameters associated with the equipment installation. The datastore(s) 142 may store information relating to any of these parameters and any such information may be retrieved or received by the configuration module 116. In certain embodiments, the configuration module 116 may retrieve or receive configuration information relating to design and/or installation parameters from the datastore(s), while configuration information relating to certain installation and/or operating parameters may be received from systems or operators obtaining the information on-site. The configuration module 116 may be able to identify, among the information stored in the datastore(s) 142, the respective configuration information associated with a particular equipment installation based on an identifier that links the configuration information with the equipment installation, or through any other suitable mechanism.

As alluded to above, the configuration module 116 may additionally, or alternatively, receive at least a portion of the configuration information 134 as input data 144. The input data 144 may have been gathered by, for example, an operator at the installation site 102 where the equipment 104 is installed. For example, in certain embodiments, certain configuration information relating to installation and/or operating parameters may be acquired on-site and provided to the monitoring computer 110, or more specifically, the configuration module 116 as the input data 144. Examples of configuration information that may be acquired on-site include information relating to the type of data acquisition system 106 being used to acquire operating data associated with the equipment installation 104, information relating to where certain measurements may be retrieved from, and so forth.

The rules engine 126 may include computer-executable instructions that when executed by the processors 118 causes the operating data 132 to be analyzed based on an associated set of configured rules. As described above, computer-executable instructions provided as part of the configuration module 116 may have been executed to configure a set of configurable rules with the configuration information 134 associated with a particular equipment installation to generate the set of configured rules. The rules engine 126 may then analyze the operating data 132 associated with the particular equipment installation based at least in part on the generated set of configured rules. The rules engine 126 may include a standard interface that is capable of receiving various sets of configurable base rules. Further, interfaces of the rules base 128 may also be standardized to allow for the sets of configurable rules to be recognized and manipulated by the rules engine 126. Moreover, the configuration information 134 may also be provided in a standardized format to allow the set of configured rules to be generated from a set of configurable base rules.

In other embodiments, in addition to analyzing the operating data 132 based on a set of configured rules, the rules engine 126 may also be configured to receive the configuration information 134 from the configuration module 116 and generate the set of configured rules from a set of configurable base rules included in the rule base 128 and the received configuration information 134. In still other embodiments, the configuration module 116 may include computer-executable instructions that when executed by the processors 118 causes the configuration module 116 to generate the set of configured rules from a set of configurable rules in the rules base 128 based on the configuration information 134, and to further analyze the operating data 132 based on the generated set of configured rules.

In certain embodiments, the rules engine 126 and/or the communication module 116 may include computer-executable instructions for analyzing operating data in conjunction with historical operating data stored in the data archive 122. For example, in various embodiments, application of the set of configured rules to current operating data as well as historical operating data may provide insights into the historical operating health of the equipment and may provide trend information that may assist in identifying potential future failure conditions.

The rules engine 126 and/or the configuration module 116 may generate output data based on the analysis of the operating data 132 using the set of configured rules. The output data may include an indication of one or more potential or detected failure conditions, information relating to potential causes for the failure conditions, and/or recommendations for preventing or resolving the failure conditions. The output data may be provided, for example, to an on-site operator via the user interface 120.

Although various operations have been described as being performed upon execution of computer-executable instructions provided as part of certain program modules, it should be appreciated that any of the operations of any of the embodiments of the disclosure may be performed upon execution of computer-executable instructions organized or implemented in any manner. That is, the specific program modules depicted in FIGS. 1A-1B are presented purely for illustrative purposes, and any combination of hardware components and/or software components implemented in accordance with any suitable configuration or methodology may be utilized to perform various operations described herein.

Figure 2:
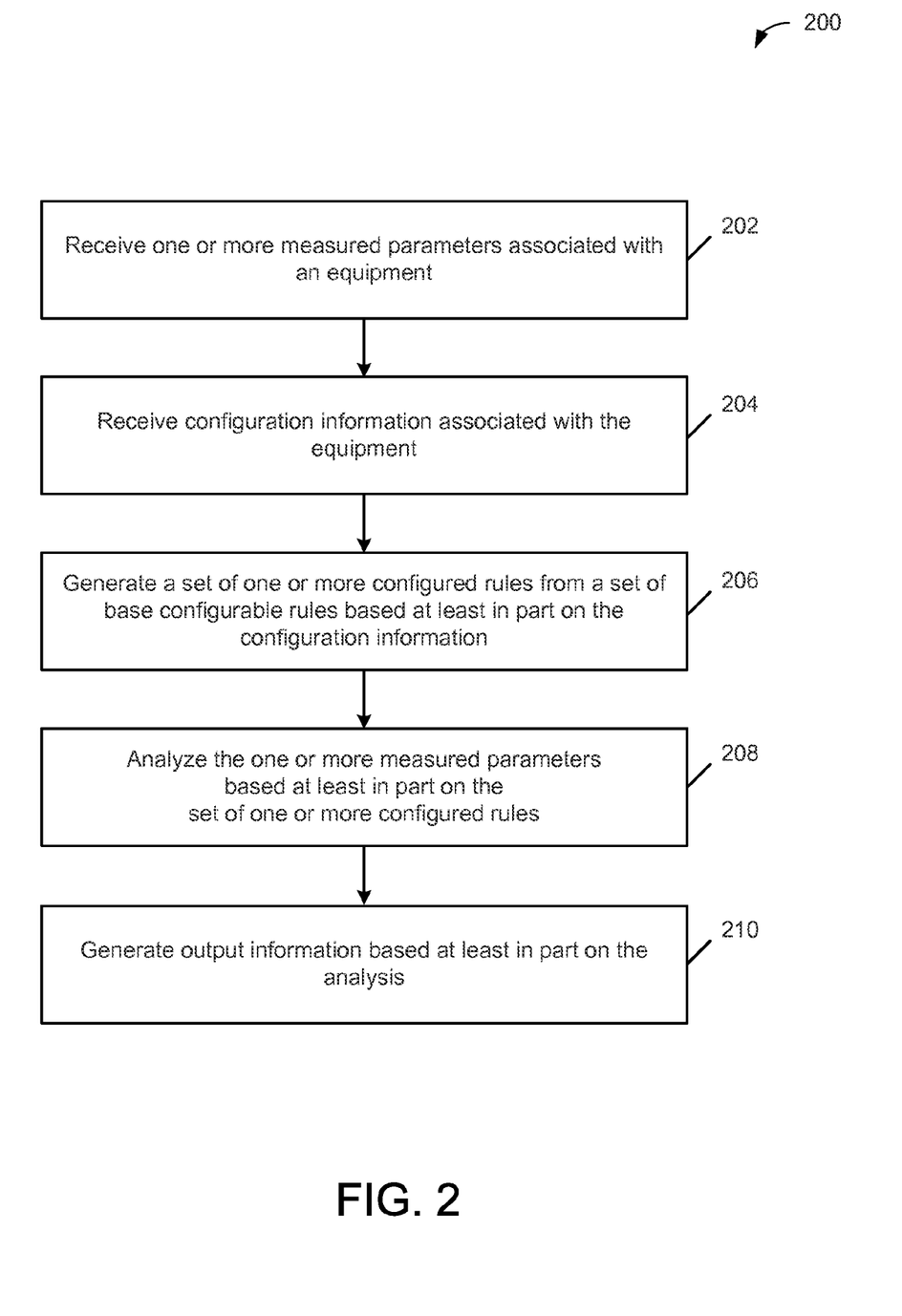
FIG. 2 is a process flow diagram depicting an illustrative method for the monitoring of equipment using a configurable rule base in accordance with one or more embodiments of the disclosure.

FIG. 2 is a process flow diagram depicting an illustrative method 200 for the monitoring of equipment using a configurable rule base in accordance with one or more embodiments of the disclosure. The process flow depicted in FIG. 2 will be described in the context of a single equipment installation 104 (e.g., a specific generator) for ease of explanation. However, it should be appreciated that the illustrative method 200 is equally applicable to any number of equipment installations.

At block 202, one or more measured parameters associated with the operation of a particular equipment installation 104 may be received. The equipment installation 104 may correspond to a generator, a turbine, or any other type of equipment. The one or more measured parameters may include any suitable parameters including, but not limited to, a temperature measurement, a pressure measurement, a fluid flow measurement, a current measurement, a power measurement, a voltage measurement, and so forth. The measured parameters may form at least a portion of the operating data 132 received by the configuration module 116 from one or more data acquisition systems 106 that gather operating data associated with operation of the equipment.

At block 204, configuration information associated with the equipment installation may be received. The configuration information may specify various design, installation, and/or operational parameters associated with the equipment. The configuration information may be received, for example, by the configuration module 116 from the datastore(s) 142 and/or as the input data 144.

At block 206, a set of one or more configured rules may be generated from a set of configurable base rules based at least in part on the configuration information in accordance with any of the methodologies previously discussed. For example, computer-executable instructions provided as part of the configuration module 116 may be executed by the processors 118 to generate the set of configured rules. Alternatively, the rules engine 126 may include computer-executable instructions that, when executed by the processors 118, causes the set of configured rules to be generated.

At block 208, the one or more measured parameters (e.g., at least a portion of the operational data 132) may be analyzed based at least in part on the set of configured rules. In various embodiments, computer-executable instructions provided as part of the rules engine 126 may be executed by the processors 118 to perform the analysis.

At block 210, output information may be generated based at least in part on the analysis performed at block 208. The output information may be generated, for example, by the rules engine 126 and may be provided to an on-site operator via, for example, the user interface 120. The output data may include an indication of one or more potential or detected failure conditions, information relating to potential causes for the failure conditions, and/or recommendations for preventing or resolving the failure conditions.

Illustrative systems and methods for the monitoring of equipment using a configurable rule base have been described. Some or all of these systems and methods may, but need not, be implemented at least partially by an architecture such as those shown in FIGS. 1-3. It should be appreciated that any of the elements or steps of any of the methods described herein need not be performed in the order described, may be rearranged or modified, and/or may be omitted entirely, depending on the circumstances. In addition, additional elements or steps may be introduced beyond those that have been described. Further, any of the elements or steps described above with respect to any method may be implemented by any number of processors or other programmable devices executing computer-executable instructions that may be stored on one or more computer-readable storage media.

Although embodiments have been described in language specific to structural features and/or methodological acts, it should be appreciated that the disclosure is not necessarily limited to the specific features or acts described. Rather, the specific features and acts are disclosed as illustrative implementations of the embodiments.

What is claimed is:

1. A method comprising:
    identifying, by one or more computer processors of a supervisory control and data acquisition (SCADA) system, configuration information associated with a generator;
    generating, by the one or more computer processors, a set of one or more configured rules from one or more configurable base rules based at least in part on the configuration information associated with the generator, wherein the set of the one or more configured rules comprises a static component and a configurable component, wherein the static component defines relationships between one or more measured parameters associated with the generator, the one or more measured parameters indicative of a potential fault condition, and wherein the configurable component defines relationships between the static component and one or more installation parameters associated with the generator, wherein the static component further includes a rule to determine the potential fault condition based at least in part on a difference between a temperature difference between an inlet and an outlet of a cooling circuit of the generator and an average value of the temperature difference exceeding a first threshold;

analyzing, by the one or more computer processors, the one or more measured parameters and the one or more installation parameters associated with the generator based at least in part on the set of one or more configured rules;

generating, by the one or more computer processors, output information associated with the generator based at least in part on the analyzing;

utilizing, by the one or more computer processors, at least a portion of the output information to facilitate identifying one or more failure conditions associated with the generator; and generating, by the one or more computer processors, one or more recommendations for addressing the one or more failure conditions.

2. The method of claim 1, wherein the one or more measured parameters associated with the generator comprise at least one of a temperature measurement, a pressure measurement, a power measurement, a current measurement, or a voltage measurement.

3. The method of claim 1, wherein the generator comprises a fluid-cooled generator.

4. The method of claim 1, wherein the configuration information comprises at least one of: information relating to one or more design parameters associated with the generator, information relating to one or more installation parameters associated with the generator, or information relating to one or more operating parameters associated with the generator.

5. The method of claim 1, further comprising: utilizing at least a portion of the output information associated with the generator to facilitate at least one of: identifying one or more anomalies associated with an operation of the generator, generating one or more alarms associated with the operation of the generator, identifying one or more potential causes for the one or more anomalies, or providing one or more recommendations relating to the operation of the generator.

6. The method of claim 1, wherein the one or more measured parameters comprises historical operating data associated with the generator.

7. The method of claim 1, wherein the configuration information is identified based at least in part on at least one of: information stored in one or more databases, or information collected from an installation site of the generator.

8. The method of claim 1, wherein the configuration information is first configuration information, the generator is a first generator, and the set of one or more configured rules is a first set of one or more configured rules, further comprising:

identifying, by the one or more computer processors, second configuration information associated with a second generator;

generating, by the one or more computer processors, a second set of one or more configured rules from the one or more configurable base rules based at least in part on the second configuration information associated with the second generator;

analyzing, by the one or more computer processors, one or more measured parameters associated with an operation of the second generator based at least in part on the second set of one or more configured rules; and generating, by the one or more computer processors, output information associated with the second generator based at least in part on the analysis of the one or more measured parameters associated with the second generator.

9. A system comprising:

one or more computers, wherein each computer comprises:

one or more processors of a supervisory control and data acquisition (SCADA) system; and at least one memory communicatively linked to the one or more processors, wherein the at least one memory of at least one of the computers comprises:

a configuration module comprising computer-executable instructions executable by at least one processor of the one or more processors to identify configuration information associated with a generator the configuration information and includes information associated with an installation of the generator;

a rule engine comprising:

computer-executable instructions executable by the at least one processor to generate, based at least in part on the configuration information, a set of one or more configured rules from one or more configurable base rules, wherein the set of the one or more configured rules comprises a static component and a configurable component, and wherein the static component defines relationships between one or more measured parameters associated with the generator, the one or more measured parameters indicative of a potential fault condition, and wherein the configurable component defines relationships between the static component and one or more installation parameters associated with the generator, wherein the static component further includes a rule to determine the potential fault condition based at least in part on a difference between a temperature difference between an inlet and an outlet of a cooling circuit of the generator and an average value of the temperature difference a first threshold;

computer-executable instructions executable by the at least one processor to analyze the one or more measured parameters and the one or more installation parameters associated with the generator based at least in part on the set of one or more configured rules;

computer-executable instructions executable by the least one processor to generate output information associated with the generator based at least in part on the analysis of the one or more measured parameters and the one or more installation parameters associated with the generator;

computer-executable instructions executable by the at least one processor to utilize at least a portion of the output information to facilitate identifying one or more failure conditions associated with the generator; and computer-executable instructions executable by the at least one processor to generate one or more recommendations for addressing the one or more failure conditions.

10. The system of claim 9, wherein the configuration information comprises at least one of: information relating to one or more design parameters associated with the generator, information relating to one or more installation parameters associated with the generator, or information relating to one or more operating parameters associated with the generator.

11. The system of claim 9, wherein the one or more measured parameters comprises historical operating data associated with the generator.

12. The system of claim 9, wherein the configuration information is first configuration information, the generator is a first generator, and the set of one or more configured rules is a first set of one or more configured rules, and wherein the configuration module further comprises: computer-executable instructions executable by the at least one processor to identify second configuration information associated with a second generator, and the rule engine further comprises:
  computer-executable instructions executable by the at least one processor to generate, based at least in part on the second configuration information, a second set of one or more configured rules from the one or more configurable base rules,
  computer-executable instructions executable by the at least one processor to analyze one or more measured parameters associated the second generator based at least in part on the second set of one or more configured rules, and
  computer-executable instructions executable by the at least one processor to generate output information associated with the second generator based at least in part on the analysis of the one or more measured parameters associated with the second generator.

13. A non-transitory computer-readable medium comprising computer-executable instructions that upon execution by one or more computer processors of a supervisory control and data acquisition (SCADA) system causes operations to be performed, the operations comprising:
  identifying configuration information associated with a generator, the configuration information includes information associated with an installation of the generator;
  generating a set of one or more configured rules from one or more configurable base rules based at least in part on the configuration information associated with the generator, wherein the set of the one or more configured rules comprises a static component and a configurable component, and wherein the static component defines relationships between one or more measured parameters associated with the generator, the one or more measured parameters indicative of a potential fault condition, and wherein the configurable component defines relationships between the static component and one or more installation parameters associated with the generator, wherein the static component further includes a rule to determine the potential fault condition based at least in part on a difference between a temperature difference between an inlet and an outlet of a cooling circuit of the generator and an average value of the temperature difference exceeding a first threshold;
  analyzing the one or more measured parameters and the one or more installation parameters associated with the generator based at least in part on the set of one or more configured rules;
  generating output information associated with the generator based at least in part on the analyzing;
  utilizing at least a portion of the output information to facilitate identifying one or more failure conditions associated with the generator; and
  generating one or more recommendations for addressing the one or more failure conditions.

14. The computer-readable medium of claim 13, wherein the one or more measured parameters comprise at least one of: a temperature measurement, a pressure measurement, a power measurement, a current measurement, or a voltage measurement.

15. The computer-readable medium of claim 13, wherein the generator comprises a fluid-cooled generator.

16. The computer-readable medium of claim 13, wherein the configuration information comprises at least one of: information relating to one or more design parameters associated with the generator, information relating to one or more installation parameters associated with the generator, or information relating to one or more operating parameters associated with the generator.

17. The computer-readable medium of claim 13, the operations further comprising: utilizing at least a portion of the output information associated with the generator to facilitate at least one of: identifying one or more anomalies associated with an operation of the generator, generating one or more alarms associated with the operation of the generator, identifying one or more potential causes of the one or more anomalies, or providing one or more recommendations relating to the operation of the generator.

18. The computer-readable of claim 13, wherein the one or more measured parameters comprises historical operating data associated with the generator.

19. The computer-readable medium of claim 13, wherein the configuration information is identified from at least one of: information stored in one or more databases, or information collected from an installation site of the first generator.

20. The computer-readable medium of claim 13, wherein the configuration information is first configuration information, the generator is a first generator, and the set of one or more configured rules is a first set of one or more configured rules, the method further comprising: identifying second configuration information associated with a second generator, generating a second set of one or more configured rules from the one or more configurable base rules based at least in part on the second configuration information associated with the second generator; analyzing one or more measured parameters associated with an operation of the second generator based at least in part on the second set of one or more configured rules; and generating output information associated with the second generator based at least in part on the analysis of the one or more measured parameters associated with the second generator.

* * * * *